UNITED STATES PATENT OFFICE.

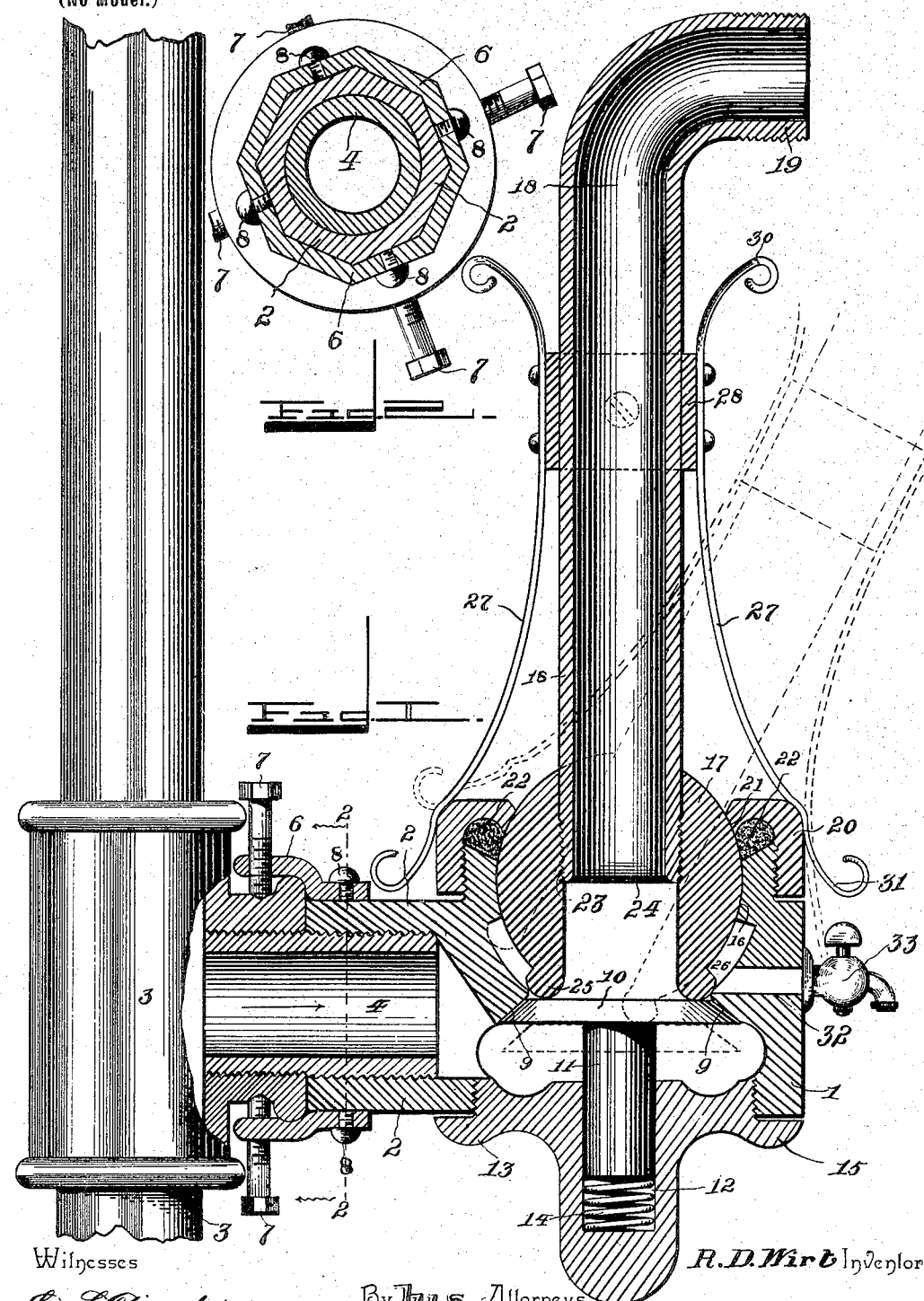

REUBEN D. WIRT, OF INDEPENDENCE, MISSOURI.

AUTOMATIC HOSE-VALVE.

SPECIFICATION forming part of Letters Patent No. 656,759, dated August 28, 1900.

Application filed December 11, 1899. Serial No. 739,982. (No model.)

*To all whom it may concern:*

Be it known that I, REUBEN D. WIRT, a citizen of the United States, residing at Independence, in the county of Jackson and State of Missouri, have invented a new and useful Automatic Hose-Valve, of which the following is a specification.

The invention relates to improvements in automatic hose-valves.

One object of the present invention is to improve the construction of valves for connecting fire-extinguishing hose with the source of water-supply and to provide a simple, inexpensive, and efficient one, capable of being automatically operated by simply pulling upon the hose after the same has been unreeled, whereby the flow of water may be instantly started as soon as the hose is in position for use.

A further object of the invention is to provide a valve of this character which may be readily shut off and which will be held against accidental movement when the hose is not in use.

The invention consists in the construction and novel combination and arrangement of parts, hereinafter fully described, illustrated in the accompanying drawings, and pointed out in the claims hereto appended.

In the drawings, Figure 1 is a vertical sectional view of an automatic valve constructed in accordance with this invention. Fig. 2 is a sectional view on line 2 2 of Fig. 1.

Like numerals of reference designate corresponding parts in both figures of the drawings.

1 designates a casing provided at the back with a tubular extension 2, interiorly threaded and connected with a T-coupling 3 by a short pipe 4, screwed into the coupling and into the tubular extension of the casing, as clearly illustrated in Fig. 1 of the accompanying drawings. The outer face of the tubular extension is octagonal or of other polygonal shape, and it receives the inner portion 5 of a sleeve 6, which fits over the arm of the coupling, as clearly illustrated in Fig. 1, and which is secured to the said arm by means of clamping-screws 7, engaging the coupling back of the rib or flange, whereby the sleeve is securely interlocked with the coupling. The polygonal inner portion of the sleeve is adjustably secured to the tubular extension of the casing by means of screws 8, passing through the sleeve and engaging the tubular extension of the casing. By this construction the casing is effectually prevented from rotating on the short pipe and being unscrewed therefrom when the valve is operated, as hereinafter explained.

The casing is provided with an approximately centrally-arranged horizontal valve-seat 9, which is flared downwardly and which is engaged by a spring-actuated valve 10. The valve, which has a beveled periphery to fit against the valve-seat, is provided with a depending stem 11, extending into a socket 12 of a removable cap 13, which is threaded into an opening at the bottom of the casing. A coiled spring 14 is interposed between the bottom of the socket and the lower end of the stem. The valve, which is closed automatically by the spring when it is free to move upward, is held firmly in its closed position by the said spring and by the pressure of the water. The cap 13 is provided with an annular flange 15, extending beyond its threaded portion, and a suitable packing may be arranged at this point to prevent any leakage at the bottom of the casing. The upper portion of the casing is provided with a semi-socket 16, located above the valve and receiving a ball 17 of a movable pipe or arm, which is substantially L-shaped and which is designed to have a hose coupled to its upper end 19, the latter being threaded for the reception of such hose. The upper portion of the casing is reduced and exteriorly threaded to receive a collar 20, substantially L-shaped in cross-section and extending inward at its upper portion and provided with an inner curved face 21, located in the same curved plane as the walls of the socket 16 and adapted to engage the ball above the center thereof and hold the same firmly in the socket. A packing 22 is interposed between the casing and the inwardly-extending flange or top portion of the collar to prevent any leakage at the top of the casing. By screwing the collar downward the packing is compressed and forced against the ball, as will be readily apparent.

The ball is provided with a central bore and has a threaded upper or outer portion 23 to be engaged by the lower threaded end 24 of the movable arm or member 18, and the said ball is provided at the inner or lower end of its bore with an annular rib or enlargement 25, exteriorly rounded and operating in curved recesses 26 of the casing, such recesses being formed in the walls of the socket at the bottom thereof. The ball is adapted to be rotated to permit the upper end 19 to be turned in any direction, and the arm or tube 18 is adapted to be oscillated, as illustrated in dotted lines in Fig. 1 of the accompanying drawings, to carry the annular rib or enlargement 25 into engagement with the valve to open the same and to cause the water from the supply-pipe to flow through the movable arm or member 18. This construction permits the upper or outer end of the movable arm or section to be turned or oscillated in any direction, and after the hose has been unreeled the valve may be opened by simply pulling it sufficiently to oscillate the arm and disengage springs 27 from the upper edge of the collar of the casing.

The springs which are secured near their upper or outer ends to a band 28 are provided near their lower or inner ends with bends 30, forming inner recesses to engage the upper edge of the collar or section 20 of the casing, and the said upper edge is rounded to enable the springs to be readily disengaged from it. The springs engage the collar or band with sufficient power to prevent the arm from being accidentally oscillated when the hose is not in use. The band 28, to which the springs are fastened, may be secured to the arm by a clamping-screw or any other suitable fastening device. The lower free ends of the springs are coiled at 31 to form rounded portions which will not interfere with their movement in engaging the springs with the casing. The casing is provided at its front with a bore or passage 32, in which is threaded a drip-cock 33, to enable the water to be drawn off at that point.

The depending socket of the cap or nut 13 is provided with a polygonal exterior, forming a wrench-receiving surface and enabling the nut or cap to be readily screwed into and out of the casing by a wrench or similar tool.

It will be seen that the automatic valve is simple and comparatively inexpensive in construction, that it is positive and reliable in operation, and that in an emergency the hose can be run out through the fire and the water started by simply pulling upon the hose. It will also be apparent that the movable arm or member may be rotated to turn its upper end in any direction, that it is easily oscillated to return it to its normal position to close the valve, and that it is held in such position to prevent the valve from being accidentally opened. The device may also be advantageously employed for various other purposes and for fire-hose, as will be readily apparent.

Changes in the form, proportion, size, and the minor details of construction within the scope of the appended claims may be resorted to without departing from the spirit or sacrificing any of the advantages of this invention.

What is claimed is—

1. A device of the class described comprising a casing designed to be connected with a water-supply and having a socket, a valve arranged within the casing and held normally closed, and a movable tubular arm mounted in the socket and adapted to have a hose attached to it, said arm being adapted to be operated by pulling upon the hose, whereby when the latter is unreeled, the water may be instantly started, substantially as described.

2. A device of the class described comprising a casing having a valve-seat and designed to be connected to a supply-pipe, a movable arm mounted on the casing, a spring-actuated valve arranged on the valve-seat and adapted to be opened by the movable arm, and means for detachably interlocking the arm with the casing for holding it normally out of engagement with the valve, substantially as described.

3. A device of the class described comprising a casing having a valve seat and provided with a partial socket having its walls recessed, a valve engaging the seat, and a movable arm mounted in the socket and having a projecting portion arranged in the recess of the walls of the socket and adapted to engage and open the valve when the arm is moved, substantially as described.

4. A device of the class described comprising a casing having a valve-seat and provided with a socket, a tubular arm having a ball arranged in the socket and provided with a projecting portion, a valve arranged on the seat and adapted to be engaged by the projecting portion of the said arm, and a collar or section mounted on the casing and forming a continuation of the socket and retaining the ball therein, substantially as described.

5. A device of the class described comprising a casing having a valve-seat, a nut or cap located below the valve-seat and having a socket, a valve engaging the seat and provided with a stem fitting in the socket of the cap or nut, a spring interposed between the stem and the bottom of the socket, a tubular arm having a ball mounted in the casing above the valve and provided with a projecting portion to engage the said valve, and a collar retaining the ball in the casing, substantially as described.

6. A device of the class described comprising a casing having a valve-seat, a nut or cap arranged at the bottom of the casing and provided with a socket, a spring-actuated valve fitting against the valve-seat and having a stem extending into the said socket, and a movable arm mounted in the upper portion of the casing and provided with means for engaging the valve to open the same, substantially as described.

7. A device of the class described comprising a casing designed to be connected with a water-supply, a valve arranged within the casing, a tubular arm adapted to receive a hose and mounted on the casing and provided with means for engaging and opening the valve, and springs mounted on the arm and having their free ends engaging the casing, whereby the arm is held out of engagement with the valve, substantially as described.

8. A device of the class described comprising a casing provided with a valve-seat, a valve engaging the seat, a tubular arm designed to be connected with the hose and arranged to open the valve, and a drip-cock communicating with the interior of the casing at a point adjacent to the arm, substantially as described.

9. A device of the class described comprising a casing having a polygonal extension, interiorly threaded and adapted to receive a pipe, a sleeve having an inner polygonal portion to fit the said extension and provided with an outer enlarged portion adapted to receive a coupling, fastening devices mounted on the inner and outer portions of the sleeve, a valve arranged within the casing, and a tubular arm provided with means for engaging the valve to open the same, substantially as described.

10. A device of the class described comprising a casing designed to be connected with a water-supply, a spring-pressed valve arranged within the casing and normally held closed, and a movable tubular arm, adapted to have a hose attached to it and capable of being operated by pulling upon the hose, said arm being arranged to force the valve open against the action of the spring, whereby the water is started when the hose is pulled, substantially as described.

11. A device of the class described comprising a casing designed to be connected with a water-supply, a spring-actuated valve arranged within the casing and normally held closed, and a movable tubular arm directly engaging the valve and capable of opening the same, said arm being adapted to receive a hose, whereby the water may be started by simply pulling upon the hose, substantially as described.

In testimony that I claim the foregoing as my own I have hereto affixed my signature in the presence of two witnesses.

REUBEN D. WIRT.

Witnesses:
J. H. PARKER,
H. CHANDLER.